PAINT SUPPLY APPARATUS

Filed Feb. 18, 1965 6 Sheets-Sheet 1

INVENTORS:
WILLIAM D. GAUTHIER,
JOSEPH H. McNINCH, JR.
BY Owen & Owen
ATT'YS.

Feb. 21, 1967 W. D. GAUTHIER ETAL 3,305,137

PAINT SUPPLY APPARATUS

Filed Feb. 18, 1965

6 Sheets-Sheet 2

INVENTORS:
WILLIAM D. GAUTHIER,
JOSEPH H. McNINCH, JR.
BY [signature]
ATT'YS.

INVENTORS:
WILLIAM D. GAUTHIER,
JOSEPH H. McNINCH, JR.
BY
Owen & Owen
ATT'YS.

INVENTORS:
WILLIAM D. GAUTHIER,
JOSEPH H. McNINCH, JR.
BY
Owen & Owen
ATT'YS.

INVENTORS:
WILLIAM D. GAUTHIER,
JOSEPH H. MCNINCH, JR.
BY Owen & Owen
ATT'YS.

PAINT SUPPLY APPARATUS

Filed Feb. 18, 1965

INVENTORS:
WILLIAM D. GAUTHIER,
JOSEPH H. McNINCH, JR.
BY
ATT'YS.

United States Patent Office 3,305,137

Patented Feb. 21, 1967

3,305,137

PAINT SUPPLY APPARATUS

William D. Gauthier, Sylvania Township, Lucas County, and Joseph H. McNinch, Jr., Toledo, Ohio, assignors to The De Vilbiss Company, Toledo, Ohio, a corporation of Ohio Filed Feb. 18, 1965, Ser. No. 433,749
9 Claims. (Cl. 222—136)

This invention relates to a paint supply apparatus of the type used with airless spray guns, or spray guns from which atomization takes place by reason of the discharge of coating material under high hydrostatic pressure.

Airless spray guns require that paint be supplied to the nozzle opening at pressures ranging from 800 or 900 pounds per square inch to well over 2000 pounds per square inch; this pressure is obtained by driving a positive displacement paint pump which supplies paint to the spray guns at the elevated pressure.

At the present time the paint supply apparatus for airless spray guns comprises an air-operated pump and its associated controls that mount directly on a paint container or are arranged so that the pump and its driving air motor are carried by the container and the controls are wall mounted. The air supply for the air motor that drives the pump takes the form of a pressure-regulated connection to a shop air line, or in some instances the motive air is taken from a cart-mounted portable compressor driven by its own electric motor. The electric motor required to drive a compressor having a capacity large enough for the intended service may be as large as 2.5 or 3 horsepower. Such motors operate on at least 220 volts so that the number of electrical outlets available is usually limited in most plants. Thus, the known paint supply apparatus for airless guns cannot ordinarily be put on a truck, taken to a small job, unloaded and be ready for operation simply by plugging into any existing electrical outlet. Much more preparation at the job site is required, and the versatility of the airless spraying system suffers as a result.

It is the primary object of the invention to provide a portable paint supply system for airless spray guns comprising a relatively light-weight, compact unit mounted on a cart or dolly and comprising an electrically-driven, hydraulically-operated paint pump with provisions on the cart or dolly for carrying a standard size paint can or drum and a solvent container. The arrangement of the parts is such that the paint pump may be easily elevated from the paint drum, swung around to a predetermined position, and lowered into the solvent container. While in this position the mounting location for the paint drum is unencumbered and the drum may be removed and replaced. At the same time the operator may clean or purge the system by flushing solvent through it.

According to the invention, a positive displacement power oil pump is mounted to be driven directly by a relatively small electric motor. It has been found that an electric motor of ¾ or 1 horsepower will accomplish the same ultimate output for the system as the known 2.5 or 3 horsepower electric motors used in the air operated paint pumps at the present time.

The positive displacement oil pump may be a gear pump driven by or preferably disposed on a shaft extension of a suitable electric motor. A small oil reservoir is carried near the pump and the pump discharge runs to a pressure relief valve in the preferred hydraulic circuit. The line for the operating or power oil of the hydraulic motor that operates the reciprocating paint pump extends from the pressure relief valve so that the hydraulic motor will maintain pressure on the paint system even though the paint gun is shut off or inactive. Under these conditions all of the oil (except for leakage) passes through the relief valve and the power input to the system which is not taken out as energy in the paint discharge appears as heat in the circulating oil. This energy must be dissipated and the present invention provides a heat exchanger interposed between the relief valve and the reservoir through which the oil passes from the return circuit, including the relief valve return. The heat exchanger is air-cooled and the fan for the cooling air may be driven by the same electric motor that is used to drive the positive displacement oil pump. The fan air may also be used to cool the motor if desired.

The paint pump driven by the hydraulic motor is preferably a reciprocating double-acting unit of the type that is presently used and that is presently operated by a reciprocating air motor. These pumps are quite compact and have been found to be satisfactory. The pump is readily immersed in the liquid which it supplies to the spray guns and, in fact, may be readily inserted in a small paint drum such as a five gallon paint can. One of the advantages of the present invention is that it provides for the use of a standard five gallon can and pumps directly from this to the spray gun or guns.

The front of the dolly or cart must have provision for the easy mounting of the drum or can of liquid coating material and for this reason is almost completely open. The five gallon drum of paint may weigh as much as seventy pounds when full so that the platform on which it is to be mounted or carried is relatively low and the user is not called upon to lift the can more than a few inches.

Other objects and advantages of the invention will be apparent from the following detailed description of a preferred embodiment thereof, reference being made to the accompanying drawings, in which.

Figure 1:
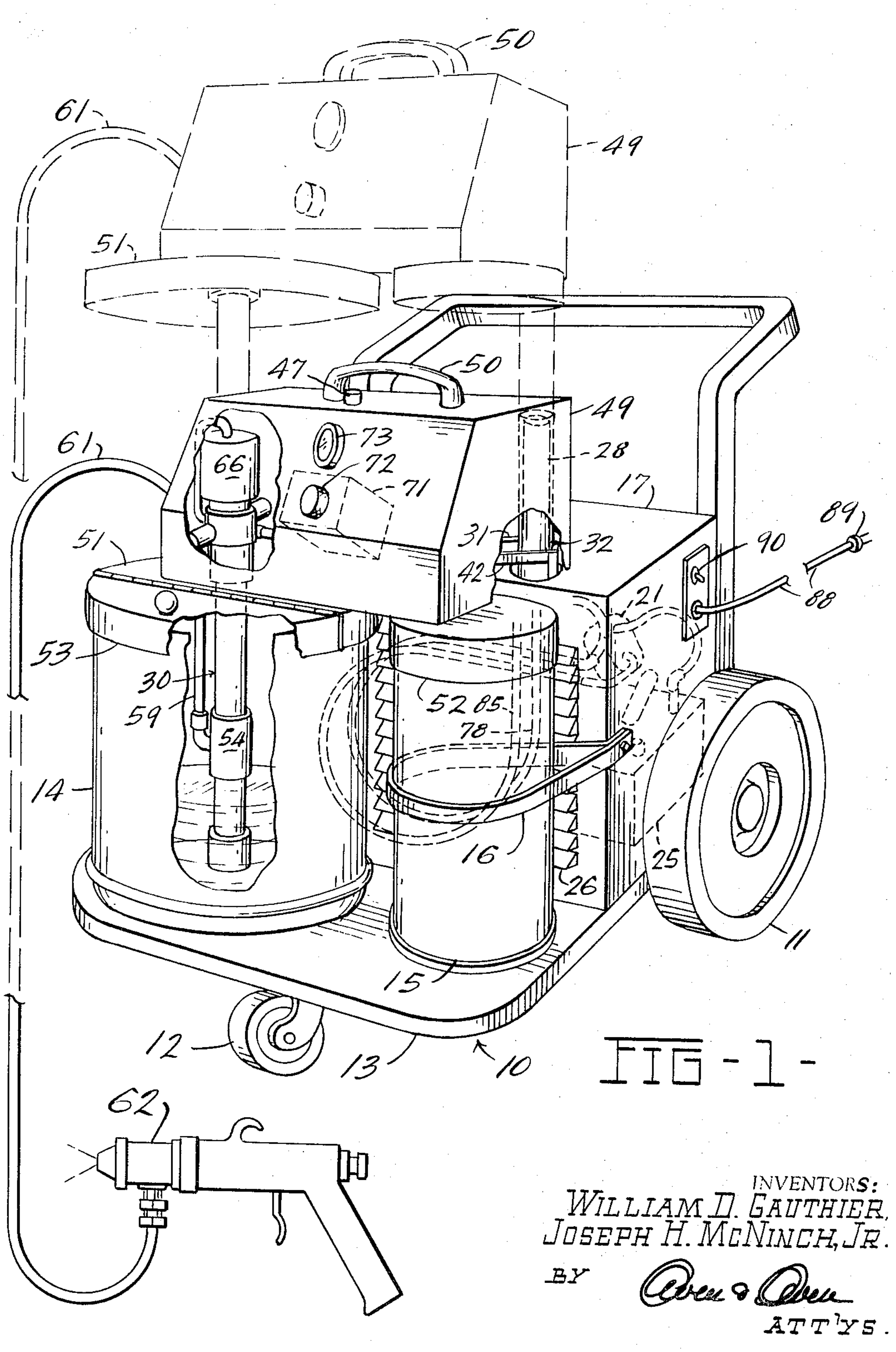
FIG. 1 is a perspective view of an overall paint supply unit embodying the invention, with part of the unit shown in an elevated position in dotted lines.

In the form of the invention shown in the drawings, the entire apparatus is mounted on a cart or dolly 10 having rear wheels 11 and one or more front casters 12 so that the cart is readily movable as required for the painting job with which it is to be used. The cart 10 has a platform 13, the front portion of which is substantially open and unencumbered in the area where it is to receive a coating material container or can 14 of a standard size. For the most part a standard five gallon container is intended to be used, although smaller or larger cans or drums may be received on the cart with equal facility.

A smaller diameter solvent container 15 is also carried by the cart platform 13 and is preferably fixed in position by straps 16 attached to a housing 17 on the rear of the cart platform or to the platform itself.

Figures 4, 5, 6, 7, 8, 9, 10, 11, 12, 13, 14:
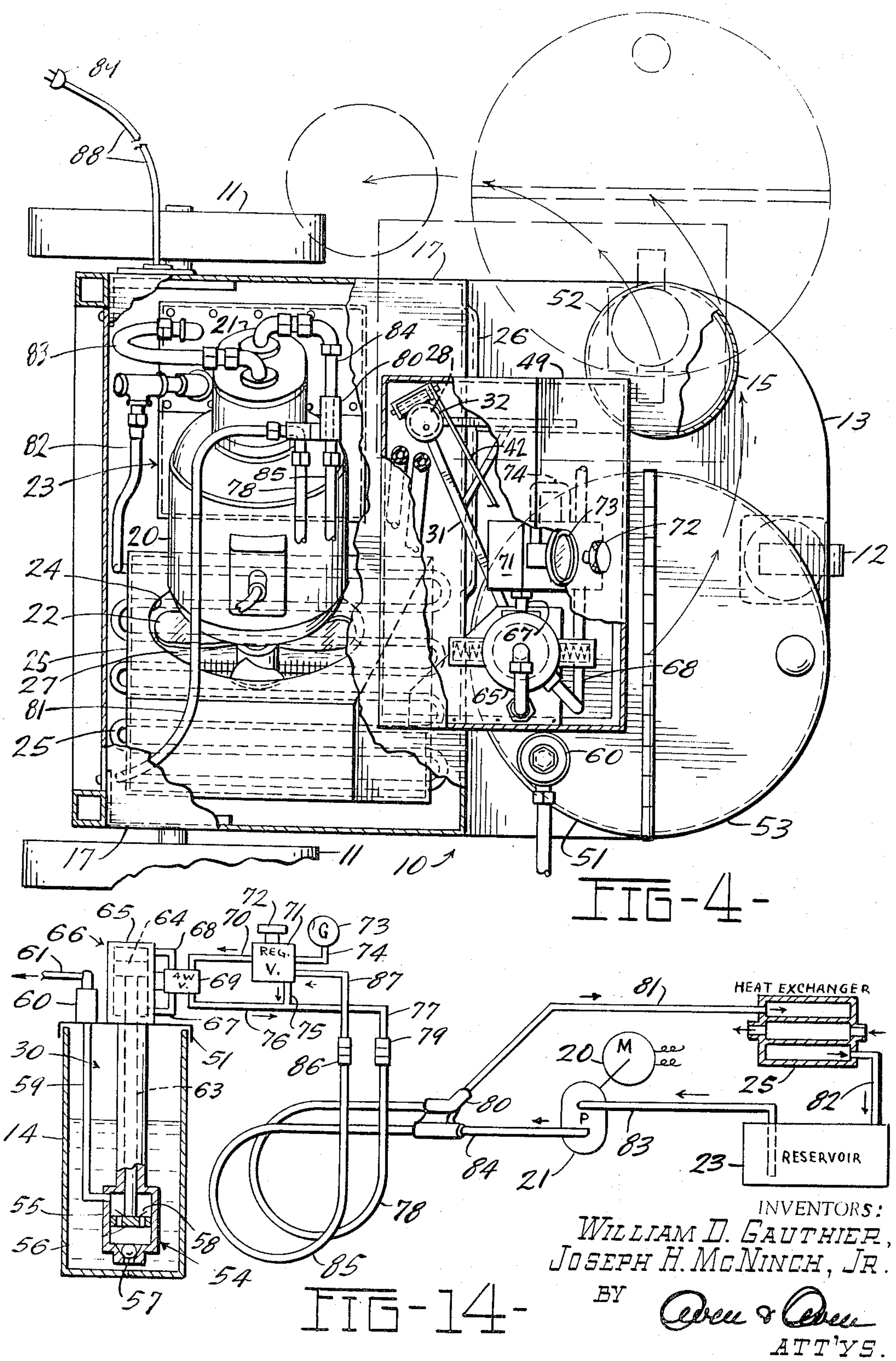
FIG. 4 is a plan view, with parts broken away, of the unit of FIGS. 1–3.
FIG. 5 is a view of part of a hydraulic system for the pump unit, with a motor and hydraulic pump removed.
FIG. 6 is a view in vertical cross section taken along the line 6—6 of FIG. 5, but with the motor and pump in place.
FIG. 7 is a fragmentary detailed view taken along the line 7—7 of FIG. 5.
FIG. 8 is a view of the pump unit and housing of FIGS. 1–3.
FIGS. 9 and 10 are detailed views partly in longitudinal section of a supporting post assembly of the pump unit.
FIG. 11 is a view in cross section taken along line 11—11 of FIG. 9.
FIG. 13 is a detailed view in cross section taken along the line 13—13 of FIG. 8.
FIG. 14 is a schematic view of the hydraulic system and the pump unit for supplying coating material.
Figure 5:
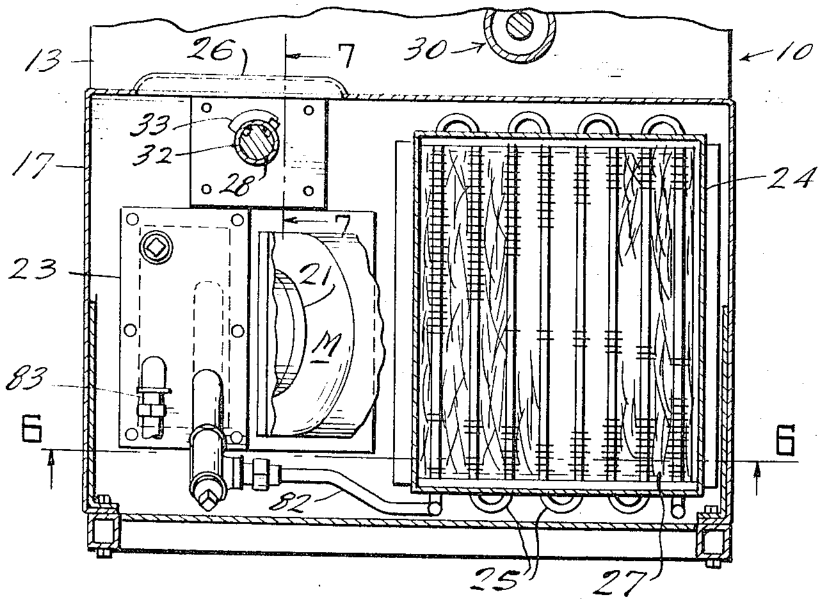
Figure 6:
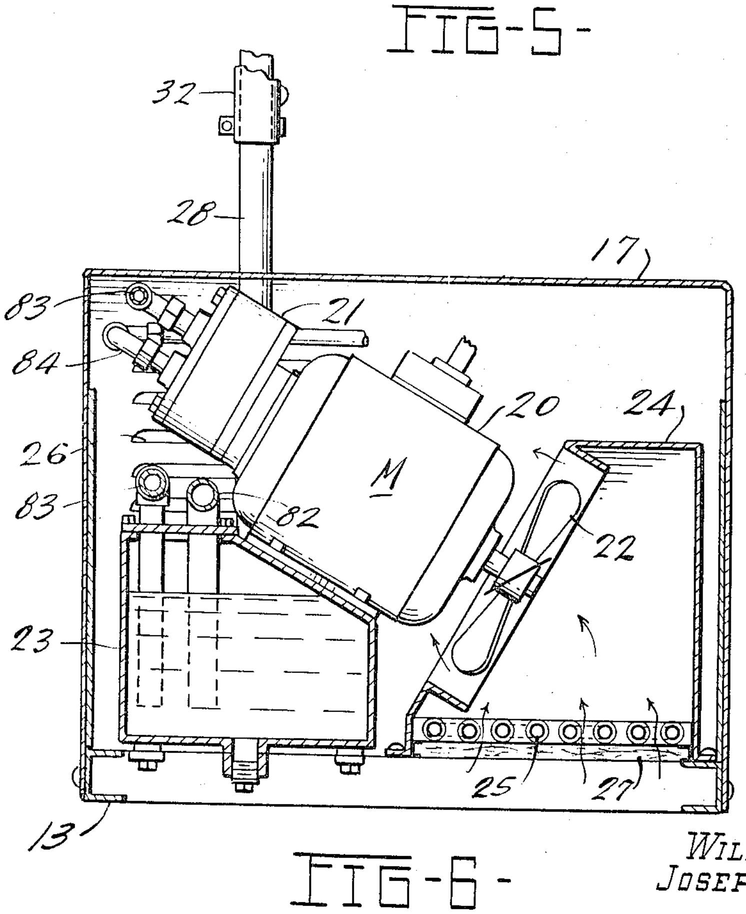
Figure 7:
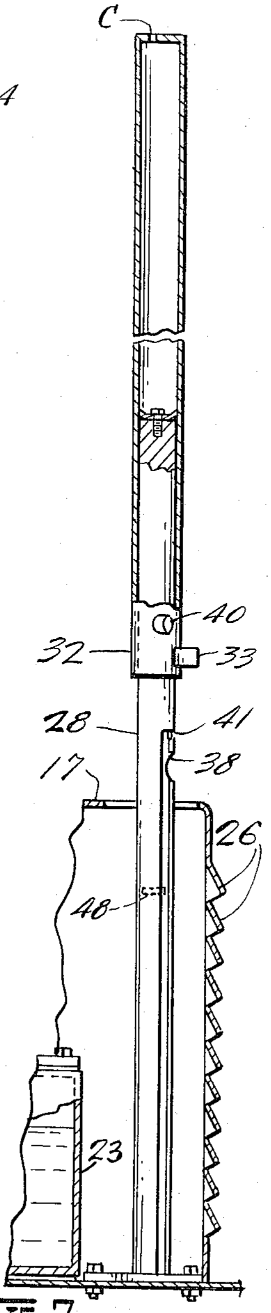
Figures 8, 9:
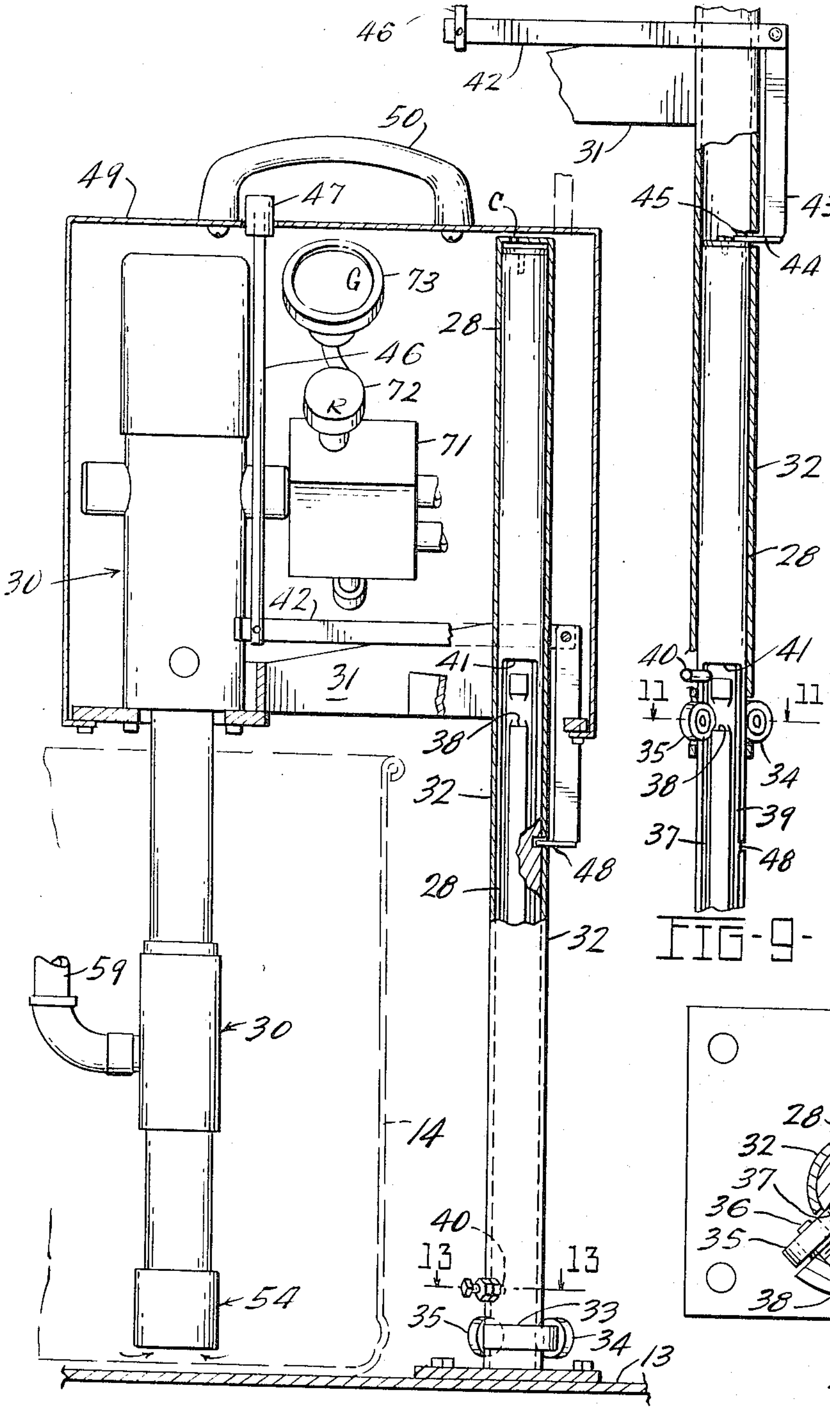
Figure 10:
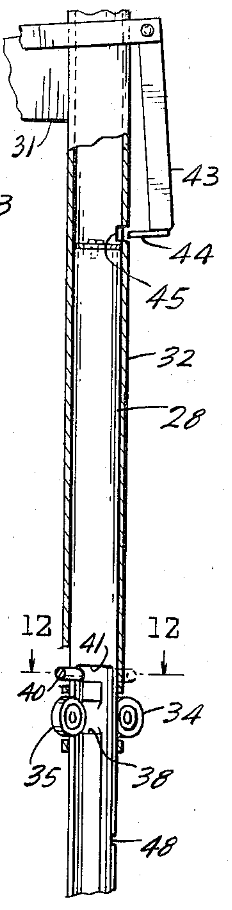
Figure 11:
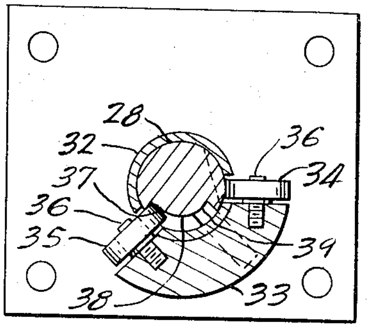
Figure 13:
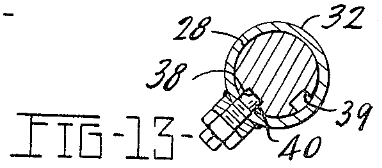

The housing 17 contains a high pressure power oil pumping assembly which comprises, as best shown in FIG. 6, an electric motor 20 preferably disposed in an angular position in the housing 17. The motor 20 drives a power oil pump 21 at one end, and a cooling fan 22 at its opposite end. The motor 20 may be conveniently mounted on a power oil reservoir 23 to conserve space in the assembly.

The cooling fan 22 is shrouded by an air controlling enclosure 24 having an open bottom across which extends a heat exchanger 25 used to cool the oil of the pumping system. Air drawn by the fan 22 thus flows into the enclosure 24 across the heat exchanger and is discharged around the motor 20 to cool both. The cooling air is ultimately discharged from the interior of the housing 17 through louvers 26 in one side of the housing or, if desired, in the top. The angular disposition of the motor and fan facilitates the air flow and minimizes air resistance within the housing 17. An air filter 27 extends across the lower side of the heat exchanger 25 to remove dust from the cooling air and thus assist in maintaining the cleanliness and effectiveness of the heat exchanger over a long working period.

Figures 3, 12:
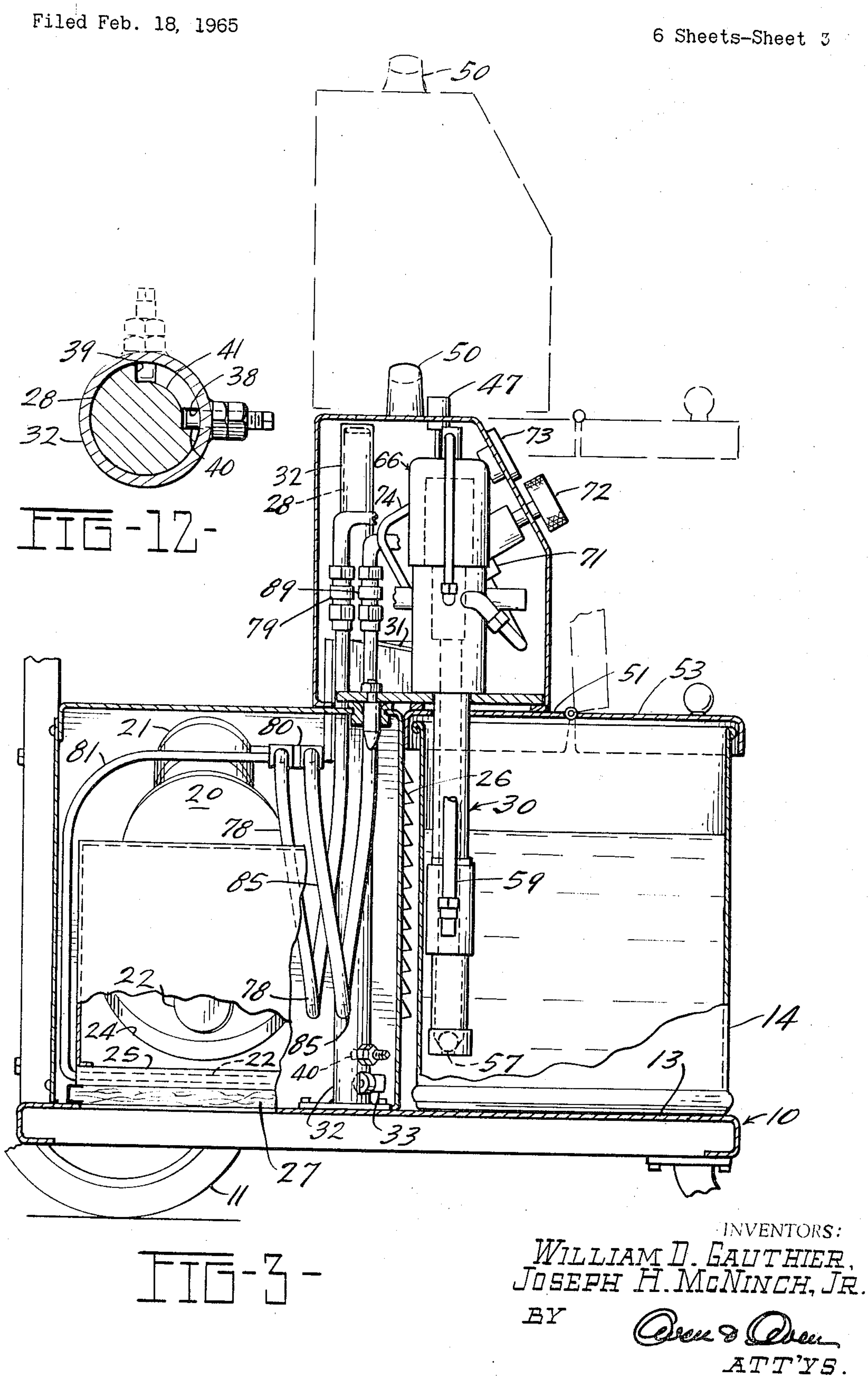
FIG. 3 is an elevational view, with parts broken away and with parts in cross section, of the unit shown in FIGS. 1 and 2.
FIG. 12 is a detailed view in cross section taken along the line 12—12 of FIG. 10.

A coating material pump mounting stem 28 is fixed at its base to the platform 13 within the confines of the housing 17 and extends above the housing to an overall height approximately twice that of the coating material container 14. The stem 28 carries a coating material pump 30 which will be subsequently described. The pump mounting, in the form shown, comprises a bracket 31 fixed to a sleeve 32 that fits closely around and over stem 28. At its lower end, as shown in FIGS. 3 and 8, the sleeve 32 carries a guide element mounting plate 33 on which spaced guide rollers 34 and 35 are mounted on respective axles 36 threaded into the plate 33. The rollers 34 and 35 are circumferentially separated by about 120° from each other, and, as shown, the roller 34 bears against the outer surface or principal diameter of the stem 28 while the roller 35 is received in a longitudinal groove 37 on the periphery of the stem. While the two rollers thus cooperate with each other and with the stem to guide the sleeve 32 in a predetermined path as the pump 30 is raised in the manner hereinafter described, the guide roller 35 also determines the angular position of the pump with respect to the stem. At the top of the groove 37, the stem 28 is further shaped to provide a circumferentially extending recess 38 communicating with a second groove 39 which also extends longitudinally of the stem 28 parallel to groove 37 and spaced a distance equal to the recess 38. Both of the grooves have cross sections which will accommodate the roller 35 and permit the sleeve 32 to be moved vertically. The recess 38 is of arcuate shape in vertical cross section in order to receive the protruding portion of the roller 35 to enable the pump mounting bracket 31 to be swung around the axis of the stem between the ends of the circumferential recess 38. The recess 38 and the grooves 37 and 39 thus constitute simple means to control the angular position of the pump 30 with respect to the coating material container 14 and the solvent container 15 and yet enable vertical movement of the pump.

In the present form of the invention the pump 30 and the associated components to be described are moved vertically by hand. The vertical movement is guided by the rollers 34 and 35 with the roller 35 running up the groove 37, thence across the recess 38, and down the companion groove 39 when the pump is raised, pivoted horizontally, and lowered. This motion takes place when the pump is lifted from the coating material container, swung around, and then lowered into the solvent container 15. In this position, the coating material container may be replaced and the spray guns associated with the unit purged by solvent from the container 15.

A safety pin 40 is affixed to the sleeve 32 above the roller 35 and projects inwardly into the same longitudinal grooves on the stem 28 as the roller 35. The purpose of the pin is to limit the maximum upward movement of the sleeve 32 and also to support the sleeve and related components during swinging movement from one longitudinal groove to the other so that full support need not depend on the cooperation between the roller 35 and the recess. When the sleeve 32 rotates as the pump unit is transferred from one container to the other, the pin 40 moves in a transverse groove 41 located above the recess 38.

The pump unit 30 is not always raised for the purpose of transferring it to the solvent container for cleaning. On the contrary, the pump unit is frequently raised to replace an empty coating material container with a full one. In such an instance, it is desirable to keep the pump unit in the upper position while the coating material container is being replaced. For this purpose, the pump unit bracket 31 has an extension 42 at the end opposite the pump unit which is pivotally connected to a depending arm 43 having an inwardly extending projection 44. The projection 44 is aligned with an opening 45 in the sleeve 32 and is always aligned with the opening since the extension 42 and the sleeve 32 move together. When the sleeve 32 is raised to its upper position, the projection 44 will be above the upper end of the stem or post 28 and will swing into the opening 45 to engage the top of, or a groove in, the stem 28 to prevent the sleeve from being lowered. The paint container can then be replaced, after which the projection 44 is retracted manually by the operator and the unit again lowered into operating position. It may be noted that the projection 44 also serves as a safety device to prevent accidental dropping of the unit when in the uppermost position. The present invention also includes a simple safety device in the form of a flexible packing ring fixed to the top of the stem 28 and cooperating with the interior of the sleeve 32 to act as a dashpot or checking piston. To this end, the upper end of the sleeve 32 is closed off by a plate or the like on which a small orifice C is drilled. The area of the orifice determines the rate at which the unit can descend over the stem 28. The action is much like a conventional pneumatic door check.

The projection 44 is easily released either by pulling outwardly on the arm 43 or by pushing downwardly on a link 46 by means of a button 47, the link 46 being pivotally connected to an end of the lever extension 42. The button 47 extends through the top of a second, smaller housing 49 which has a handle 50 to facilitate raising and lowering of the pump unit 30.

Figure 2:
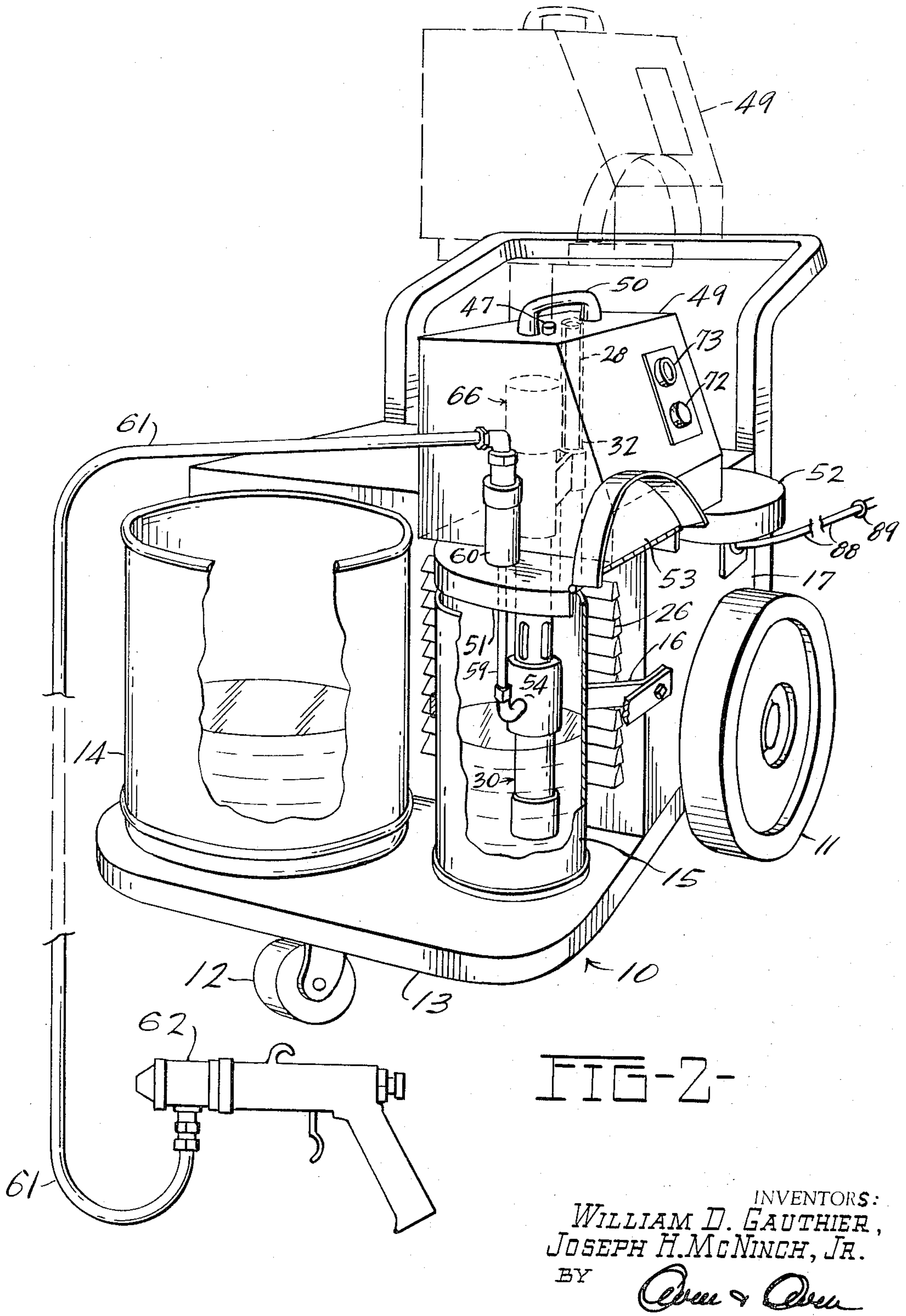
FIG. 2 is a perspective view similar to FIG. 1 but with the pump portion of the unit shown in a different position and also shown in a different elevated position in dotted lines.

Two container lids 51 and 52 are affixed to the bottom of the housing 49 in a manner such that they cover the containers 14 and 15 when the housing 49 is in its lower position. The lid 51 also is hinged so it can be raised for conditioning and inspection of the contents of the coating material container 14. When the unit is in its second or cleaning position, as shown in FIG. 2, the lid 51 will be over the solvent container 15 with the solvent container lid 52 located over the housing 17. A hinged portion 53 of the lid 51 can be raised at this point so as to be out of the way and to prevent the possibility of paint thereon dripping beyond the edge of the platform 13 and onto the floor.

The pump unit 30 includes a double-acting hydraulically-operated paint pump 54 (FIG. 14) which has a cylinder 55, a piston 56, and check valves 57 and 58. The piston 56 forces the paint under pressure through an outlet line 59 to a connection 60 mounted on the lid 51. From here, the paint is supplied through a flexible line 61 to a spray gun 62 (FIGS. 1 and 2).

The paint pump piston 56 is connected by a rod 63 to a driving piston 64 located in an actuating cylinder 65 of a reciprocating hydraulic drive motor 66. Oil is supplied alternately to the ends of the cylinder 65 through lines 67 and 68 controlled by a valve 69. The position of the valve 69 is actuated in any suitable manner by the position of the piston 64 as explained in detail in a co-pending application of Gauthier and McNinch, Jr., Ser. No. 399,114. Oil is supplied to the reversing valve 69 through a supply line 70 connected to a regulator valve 71 which is mounted in the upper housing 49 with a control knob 72 extending out of the housing for easy access. A pressure gauge 73 also is mounted on the housing and indicates the pressure at the valve 71 through a line 74. The regulator valve 71 controls the pressure of oil fed to the line 70 and thus to the reversing valve 69. The oil that is not required for actuation of the pump drive motor 66 is returned through a by-pass line 75 and back to the reservoir 23, along with oil from the pump drive motor 66 flowing through a line 76. This return oil passes through a return line 77 having a flexible portion 78 connected thereto by a swivel fitting 79. The flexible return line portion 78 is connected by a combination bracket and fitting 80 to a rigid return line 81 connected to the heat exchanger 25 so that the oil returning to the reservoir 23 is cooled by air drawn through the heat exchanger by the fan 22.

Oil is supplied to the high pressure pump 21 from the reservoir 23 through a supply line 83. From the pump 21, the high pressure oil is then passed to the regulator valve 71 through a rigid supply line 84, the fitting 80, a flexible supply line 85, a fitting 86, and a rigid line 87 connected to the regulator valve 71.

In the operation of the unit, the cart 10 is wheeled to the desired location and the housing 49 is raised by the handle 50 to the upper position. The paint container 14 and the solvent container 15 are then placed in position, if not previously done, and the housing 49 is then lowered to the position shown in FIG. 1. An electric supply line 88 and a plug 89 are then connected to a nearby receptacle and a switch 90 is turned on to operate the motor 20. The regulator valve 71 is then adjusted to provide the proper quantity of paint as determined by its pressure setting and the unit is ready for operation. When it becomes necessary to replace the paint container to flush the system, the housing 49 and paint pump components are raised, swung to a position over the solvent container 15, and lowered therein.

If the operator should wish to stop the painting operation for any period of time for rest or the like, it is not necessary that the motor and hydraulic system be turned off. The system can be left running and the paint will be kept under pressure at the spray gun ready for operation to be resumed.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. A portable unit for supplying coating material under pressure to an airless spray gun, said unit comprising a cart having means for supporting a coating material container at a predetermined first portion thereof, said cart having means for supporting a solvent container at a predetermined second portion thereof spaced from said first portion, a coating material pump assembly for placing coating material under high pressure and supplying said pressurized coating material to the spray gun, means for supporting said pump assembly in a first position bearing a predetermined relationship with respect to said coating material container, means for guiding said assembly toward and away from said first position, means for supporting said assembly in a second position bearing a predetermined relationship with respect to said solvent container, means for guiding said assembly toward and away from said second position, and means enabling said assembly to move between said first and said second positions.

2. A unit according to claim 1 characterized by means for holding said pump assembly in an intermediate position away from both of said first and second portions.

3. A portable unit for supplying coating material under pressure to an airless spray gun, said unit comprising a cart having means for supporting a coating material container and a solvent container, a coating material pump unit for pressurizing coating material from the coating material container and for supplying it to the spray gun, means for supporting said pump unit in a first position effective to supply the coating material to the spray gun, means for guiding said unit toward and away from the first position and the coating material container, means for supporting said pump unit in a second position effective to pump solvent from the solvent container, means for guiding said pump unit toward and away from the second position and the solvent container, and means enabling said pump unit to move between its first and second positions.

4. A portable unit according to claim 3 wherein said means for guiding said unit toward and away from the first portion and the means for guiding said pump unit toward and away from the second portion comprises an upright post mounted on said cart and a sleeve affixed to said pump unit and slidably mounted on said post.

5. A portable unit for supplying coating material under pressure to an airless spray gun, said unit comprising a cart having means for supporting a coating material container and a solvent container, a coating material pump assembly for pressurizing coating material from the coating material container and for supplying it to the spray gun, an upright supporting post on said cart, a sleeve slidably mounted on said post and supporting said pump assembly, said post having two parallel, longitudinal grooves, and a connecting recess at an upper portion of said grooves, projecting means carried by said sleeve and extending into the first groove when said pump assembly is above the coating material container and projecting into the second groove when said pump assembly is above the solvent container, said projecting means being receivable in said recess when said pump assembly is raised above said containers to an upper position and is swung from a position over one of said containers to a position over the other of said containers.

6. A portable unit according to claim 1 wherein said pump assembly includes a hydraulically-operated drive motor, a paint pump driven by said drive motor, and flexible lines connected to said drive motor for supplying oil thereto, said portable unit being further characterized by a hydraulic pump carried by said cart, an electrically-driven motor for operating said pump, said hydraulic pump being connected to said drive motor through said flexible lines.

7. A portable unit according to claim 6 characterized further by a fan mounted on a shaft of said electric motor for supplying air over said motor and said pump, and a heat exchanger communicating with said pump and said drive motor for receiving oil from said drive motor and cooling same, said heat exchanger being located in the path of air moved by said fan.

8. A unit for supplying coating material under pressure to an airless spray gun, said unit comprising a platform having a first portion to receive a coating material container and a second portion to receive a solvent container, a pump unit having a drive motor and a coating material pump therebelow for supplying coating material and solvent from their respective containers to a spray gun, means for supporting said pump unit in a first position in which said coating material pump is effective to be received in said coating material container and for supporting said pump unit in a second position in which said coating material pump is received in said solvent container, means for enabling said pump unit to be moved from one of the positions to the other, a hydraulic fluid regulator carried with said pump unit and effective to control the hydraulic fluid supplied to said drive motor, a hydraulic fluid pump carried on said platform, an electric motor for driving said hydraulic fluid pump, a heat exchanger carried by said platform, a fan mounted on said electric motor and effective to produce a current of air across said heat exchanger, and line means for connecting said hydraulic fluid pump, said regulator, said drive motor, and said heat exchanger, said line means being flexible in part to enable movement of said drive motor and said regulator relative to said hydraulic fluid pump and said heat exchanger.

9. A unit for supplying coating material under pressure to an airless spray gun, said unit comprising a platform having a first portion to receive a coating material container and a second portion to receive a solvent container, a pump unit having a drive motor and a coating material pump therebelow for supplying coating material and solvent from their respective containers to a spray gun, means for supporting said pump unit in a first position in which said coating material pump is effective to be received in said coating material container and for supporting said pump unit in a second position in which said coating material pump is received in said solvent container, and means for enabling said pump unit to be moved from one of the positions to the other.

References Cited by the Examiner

UNITED STATES PATENTS

| | | | |
|---|---|---|---|
| 295,492 | 3/1884 | Grout | 222—136 |
| 1,466,804 | 9/1923 | Orr | 222—144.5 |
| 1,586,745 | 6/1926 | Hulse | 222—146 X |
| 2,127,962 | 8/1938 | Rosener. | |
| 2,212,749 | 8/1940 | Delouch | 222—176 |
| 2,366,654 | 1/1945 | Rotter et al. | 222—333 X |
| 2,846,123 | 8/1958 | Gray | 222—385 X |
| 3,110,263 | 11/1963 | Thompson | 103—218 X |
| 3,207,378 | 9/1965 | Trumbull et al. | 222—334 X |

RAPHAEL M. LUPO, *Primary Examiner.*